(12) United States Patent
Keerl et al.

(10) Patent No.: US 8,701,604 B2
(45) Date of Patent: Apr. 22, 2014

(54) GAS COOLER FOR AN INTERNAL COMBUSTION ENGINE

(75) Inventors: Bjoern Keerl, Sachsenheim (DE); Elisabeth Lorch, Rosenfeld (DE)

(73) Assignee: Behr GmbH & Co. KG, Stuttgart (DE)

( * ) Notice: Subject to any disclaimer, the term of this patent is extended or adjusted under 35 U.S.C. 154(b) by 0 days.

(21) Appl. No.: 13/409,866

(22) Filed: Mar. 1, 2012

(65) Prior Publication Data

US 2012/0210955 A1 Aug. 23, 2012

Related U.S. Application Data

(63) Continuation of application No. PCT/EP2010/061340, filed on Aug. 4, 2010.

(30) Foreign Application Priority Data

Sep. 1, 2009 (DE) .......................... 10 2009 039 569

(51) Int. Cl.
*F02B 29/04* (2006.01)

(52) U.S. Cl.
USPC ..... 123/41.56; 165/149; 165/166; 123/41.08; 123/563

(58) Field of Classification Search
USPC .......................... 123/41.46, 41.59, 41.6, 41.1
See application file for complete search history.

(56) References Cited

U.S. PATENT DOCUMENTS

| 4,303,052 A * | 12/1981 | Manfredo et al. ............ 123/563 |
| 4,474,162 A * | 10/1984 | Mason .......................... 123/563 |
| 5,711,370 A | 1/1998 | Tanaka |
| 6,193,284 B1 | 2/2001 | King |
| 6,604,514 B1 * | 8/2003 | Englund et al. ............. 123/559.1 |
| 6,755,158 B2 | 6/2004 | Knecht et al. |
| 8,016,025 B2 * | 9/2011 | Brost et al. ..................... 165/149 |
| 2003/0037913 A1 * | 2/2003 | Knecht et al. ................ 165/122 |
| 2005/0077035 A1 | 4/2005 | Lamich |
| 2006/0016582 A1 | 1/2006 | Hashimoto et al. |
| 2006/0278377 A1 | 12/2006 | Martins et al. |
| 2009/0277165 A1 * | 11/2009 | Geskes et al. .................. 60/320 |
| 2010/0071639 A1 * | 3/2010 | Wegner et al. ............. 123/41.08 |

FOREIGN PATENT DOCUMENTS

| CN | 1157908 A | 8/1997 |
| CN | 1230649 A | 10/1999 |
| CN | 1755316 A | 4/2006 |
| DE | 101 24 383 A1 | 1/2002 |

(Continued)

OTHER PUBLICATIONS

Chinese Office Action for Chinese Application No. 201080038802.1 dated Jul. 1, 2013 with English Translation.

*Primary Examiner* — Noah Kamen
*Assistant Examiner* — Long T Tran
(74) *Attorney, Agent, or Firm* — Muncy, Geissler, Olds & Lowe, P.C.

(57) ABSTRACT

A gas cooler for an internal combustion engine is provided that includes a gas channel for permeating with a gas flow fed to the internal combustion engine in a flow direction, and a heat exchanger inserted in the gas channel in an insertion direction, wherein the heat exchanger comprises at least one connection for feeding or discharging a fluid for cooling the gas flow, wherein the connection comprises a first connection part connected to the heat exchanger before inserting the hat exchanger into the gas channel, and a second connection part that can be connected to the first connection part from the outside.

14 Claims, 3 Drawing Sheets

(56) References Cited

FOREIGN PATENT DOCUMENTS

| | | |
|---|---|---|
| DE | 101 36 861 A1 | 2/2003 |
| DE | 103 47 180 A1 | 5/2005 |
| DE | 60 2004 005 041 T2 | 11/2007 |
| DE | 20 2007 012 231 U1 | 1/2009 |
| EP | 1 329 610 A2 | 7/2003 |
| FR | 2 873 433 A1 | 1/2006 |
| JP | 2001 248448 A | 9/2001 |

* cited by examiner

GAS COOLER FOR AN INTERNAL COMBUSTION ENGINE

This nonprovisional application is a continuation of International Application No. PCT/EP2010/061340, which was filed on Aug. 4, 2010, and which claims priority to German Patent Application No. DE 10 2009 039 569.5, which was filed in Germany on Sep. 1, 2009, and which are both herein incorporated by reference.

BACKGROUND OF THE INVENTION

1. Field of the Invention

The invention relates to a gas cooler for an internal combustion engine.

2. Description of the Background Art

It is known to provide charge air coolers for indirect cooling of a gas flow in an internal combustion engine in which a heat exchanger is inserted into a housing which is permeated by the charge air. Fixed connections for connecting a cooling fluid line are provided on the heat exchanger. Due to the fixed design of the connecting pieces, the configuration thereof relative to the housing and to the direction of insertion is subject to limitations.

SUMMARY OF THE INVENTION

It is therefore an object of the invention to provide a gas cooler for an internal combustion engine which has a particularly flexible means of installation.

Due to the design of a connection, which has a first connecting part connected to the heat exchanger and a second connecting part which is connectable to the first connecting part from the outside, the heat exchanger may, for example, be first inserted into the gas channel or a housing, after which the second connecting part is attached to the first connecting part by engaging with an opening in the gas channel. This permits a versatile positioning of the connections on the heat exchanger in a given design of the gas channel. In addition, the heat exchanger may be designed with a view toward a modular system in which the connections may be provided in different positions of the gas channel, depending on the requirements.

A gas channel in the sense of the invention can be a channel for supplying a combustion gas to the internal combustion engine. The combustion gas may be pure charge air, an air/exhaust gas mixture or a recirculated exhaust gas. A gas channel is also understood to be, in particular, an intake manifold module which includes a supplying channel as well as a distribution of combustion air to the cylinders of the internal combustion engine, if necessary including connections on the cylinder head of the internal combustion engine.

In an embodiment, the heat exchanger is at least partially attached to the gas channel by connecting the two connecting parts. This simultaneously makes it possible to at least partially, possibly even completely, eliminate additional attachment means such as screws, clamps or adhesives.

In an embodiment, the first connecting part may be screwed to the second connecting part. The second connecting part particularly preferably has an outer thread which may be screwed into an inner thread of the first connecting part. This enables the heat exchanger to be designed without projecting parts, and it may be inserted into the gas channel in a particularly space-saving and versatile manner. The design of the connection of the connecting parts using a screw connection also has the essential advantage that only a small leakage flow of the fluid into the gas channel may occur even in the event of defects such as the failure of a seal, and the danger of a water hammer destroying the internal combustion engine is thus largely avoided, due to the method for connecting the screw connection of the connecting parts. Alternatively, it is also possible for the second connecting part to have an inner thread which may be screwed into an outer thread of the first connecting part.

In an embodiment, a sealing member, in particular in the form of an O ring seal, can be provided on at least one of the two connecting parts. A sealing member is particularly preferably provided on each of the two connecting parts. The sealing member makes it possible to seal the fluid against the gas channel, on the one hand, and to seal the gas channel against the outer area, on the other hand. If two sealing members are provided, a particularly secure sealing of the fluid against the outer area may also be established.

The connecting parts can each have a radial collar, a housing wall of the gas channel being accommodated between the collars at least by means of a friction fit. This permits a good seal, on the one hand, and a secure hold of the heat exchanger on the gas channel, on the other hand, to be easily achieved. A sufficient extension of the collar also causes the acting forces to be distributed onto a larger area of the housing wall, so that even a heavy heat exchanger may be securely held on a comparatively weakly dimensioned gas channel wall, which may be made, for example, of plastic. A particularly preferred dimensioning of the connecting parts in this sense is achieved if the collars have at least an outer diameter that is at least approximately twice the size of an inner diameter of the fluid-conducting passage of the connecting parts.

The first connecting part can be integrally connected to the heat exchanger, in particular by means of soldering or welding. A simple, fluid-tight and mechanically loadable connection of the first connecting part to the heat exchanger is provided in this manner. In particular, the first connecting part and the rest of the heat exchanger may be designed as a common block which is soldered in a soldering furnace.

The second connecting part can have a projection for connecting a fluid line, which is particularly preferably designed as a bead or a quick-action coupling. If a bead projection is used, a hose may be placed over the second connecting part and secured with the aid of a hose clamp, for example. However, the connecting part may also be a fast-action coupling of any known design. The features according to the invention have a particularly advantageous effect in specific embodiments in which an insertion direction of the heat exchanger and a direction of conducting the fluid into the connection do not run parallel to each other.

In an embodiment, the heat exchanger may be attached to a cover of the gas channel with the aid of the connecting parts, the cover being attachable to the gas channel together with the heat exchanger. In this manner, a simple and reliable, fluid-tight assembly on the cover may be carried out, after which the cover may be inserted into the gas channel together with the heat exchanger attached thereto under frequently unfavorable assembly conditions in the engine compartment. A configuration and assembly sequence of this type are advantageous, in particular, for maintenance purposes.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limitive of the present invention, and wherein.

DETAILED DESCRIPTION

Figure 1:
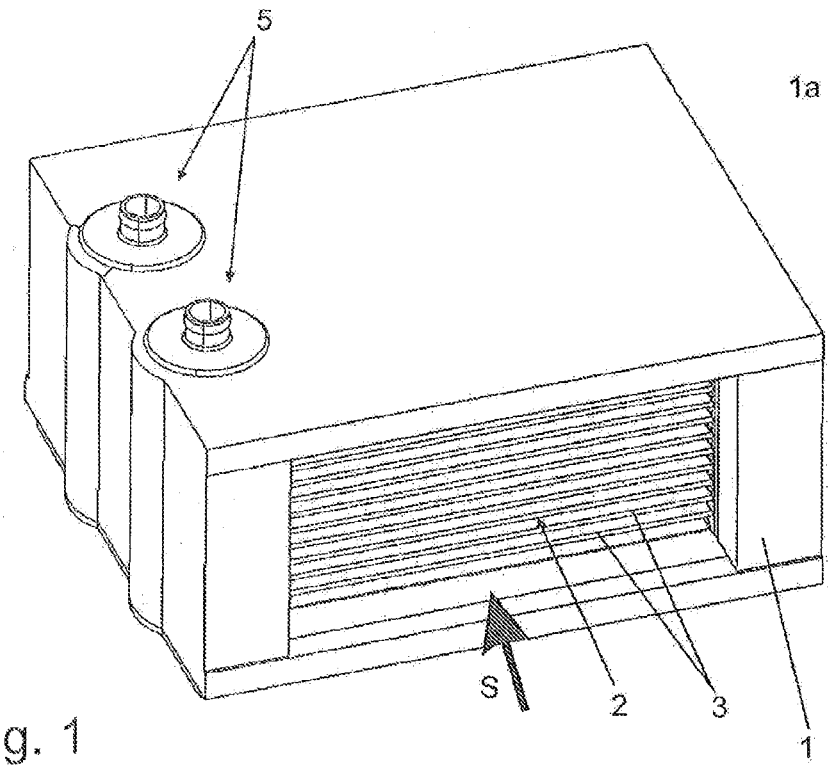
FIG. 1 shows a spatial overall view of a gas cooler according to the invention according to a first exemplary embodiment.

The gas cooler according to the invention illustrated in FIG. 1 according to a first exemplary embodiment comprises a gas channel 1, which is designed as a housing made of plastic for conducting a combustion gas for an internal combustion engine along a flow direction S. A heat exchanger 2, which is designed by a stack of flat tubes 3 which may be permeated by a fluid coolant as the cooling fluid and which has intermediate ribs (not illustrated) is disposed in gas channel 1.

Figure 6:
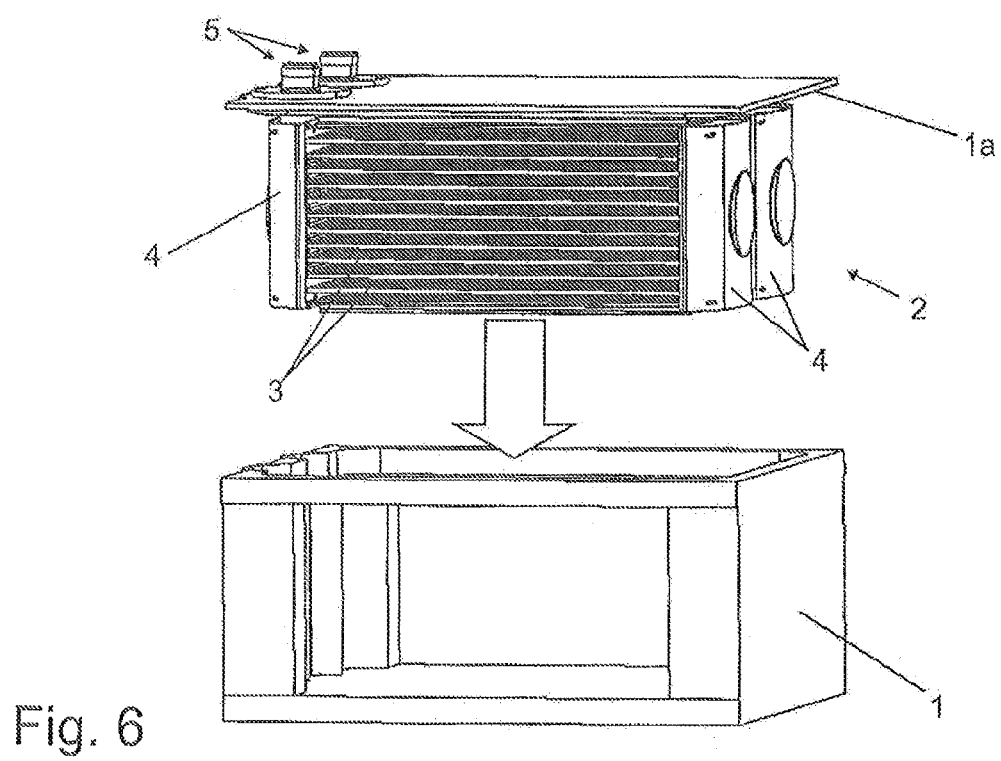
FIG. 6 shows a spatial view of the gas cooler from FIG. 1 after assembly.

Collector boxes 4, which are used to distribute the coolant to flat tubes (3), are disposed on the ends of the flat tubes (see FIG. 6, in particular). One connection 5 is provided for each of collector boxes 4 for feeding and discharging the coolant. In the present case, connections 5 are each located on side end plates of the collector boxes, so that the flow direction of the fluid into the connections runs perpendicularly to the extension direction of flat tubes 3.

Each of the two connections 5 has the same structural design and comprises a first connecting part 6 and a second connecting part 7. First connecting part 6 is designed as a rotationally symmetrical component which has a hollow cylindrical neck piece 6a and a collar 6b which projects radially from neck piece 6a. A groove-like, annular indentation 6c for inserting a first sealing member in the form of an O ring seal 8 are located in collar 6b.

Second connecting part 7 is also designed as a largely rotationally symmetrical body which comprises a hollow cylindrical screw connecting piece 7a having an outer thread provided thereupon and a collar 7b projecting radially from screw connecting piece 7a.

A projection for connecting a fluid line which is designed as a hollow cylindrical section 7c having a bead 7d is provided on the side of collar 7b opposite screw connecting piece 7a. A hose for fluid feeding or discharge may be pushed over section 7c having bead 7d and secured with the aid of a hose clamp.

An annular recess 7e adjoining screw connecting piece 7a is also provided in collar 7b on the side of the screw connecting piece for inserting a second O ring seal 9.

The two connecting pieces 7, 8 may each be designed as metal molded parts, for example by deep-drawing them from a metal disk. A brazing may be provided at least on the side of the collar on the neck piece side, in particular in the case of first connecting piece 6. First connecting piece 6 is inserted into a corresponding opening in collector box 4 of heat exchanger 2 and soldered over a wide area with the aid of neck piece 6a. In particular, first connecting piece 6 is soldered to form a block in a soldering furnace together with collector boxes 4 formed from brazed sheets and the flat tubes and ribs inserted into passages in the bottom of collector boxes 4.

An inner thread, into which hollow-cylindrical screw connecting piece 7a of second connecting piece 7 may be screwed by means of its outer thread, is provided in neck piece 6a of first connecting part 6.

As shown in the sectional drawing in FIG. 2, in particular in connection with the exploded view of the gas cooler according to FIG. 6, the gas cooler is assembled as follows: First O ring seal 8 is inserted into groove 6c of first connecting part 6, after which a cover 1a of gas channel 1, in which two openings are provided for connections 5, is placed on heat exchanger 2 or the first connecting parts.

The second connecting parts, into which second ring seals 9 were previously inserted into indentations 7e, are then screwed into first connecting parts 6, hollow cylindrical screw connecting pieces 7a engaging with the openings in cover 1a. As illustrated in the sectional view in FIG. 2, cover 1a is thus clamped by means of a friction fit between collars 6b, 7b of connecting parts 6, 7, ring seals 8, 9 guaranteeing a sealing of the fluid against the inner chamber of gas channel 1 and against the outer area and simultaneously guaranteeing a sealing on the gas side between the inner chamber and the outer area.

Figure 2:
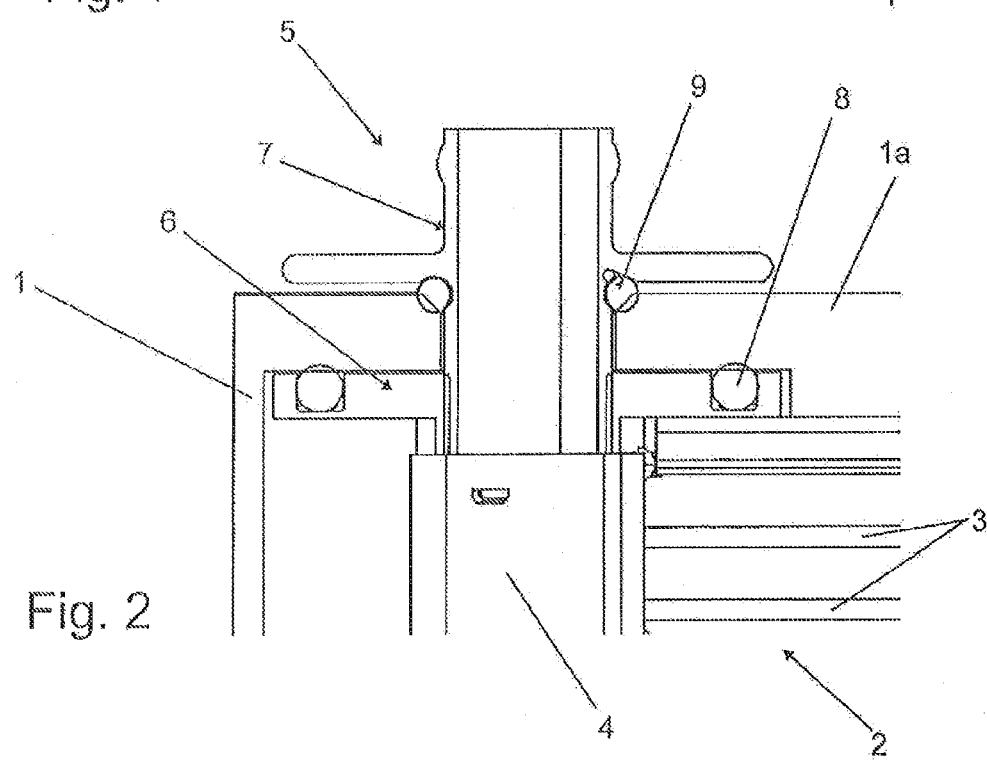
FIG. 2 shows a partial sectional view of the gas cooler from FIG. 1 in the area of a fluid connection.
Figure 3:
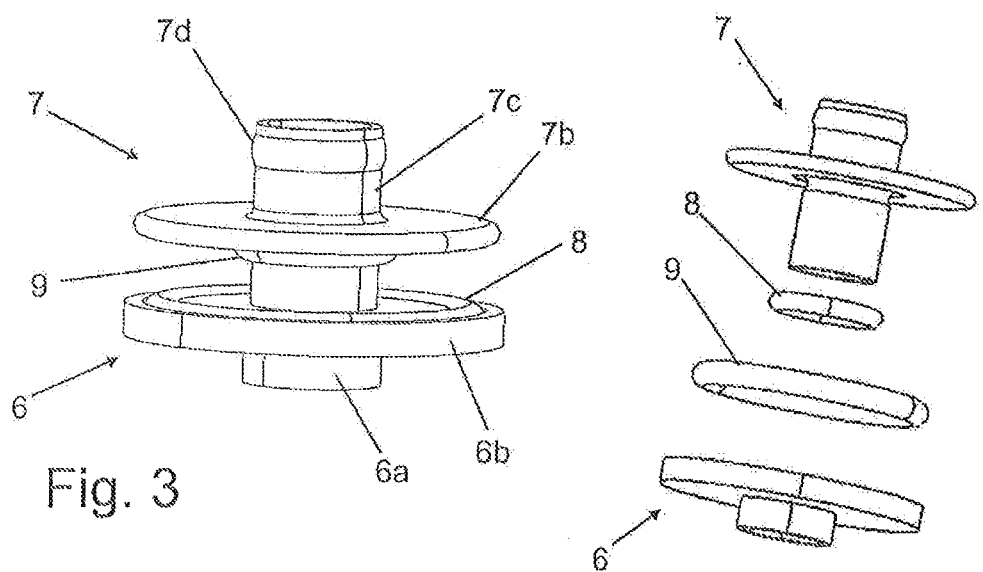
FIG. 3 shows two spatial representations of a connection of the gas cooler from FIG. 1.
Figure 4:
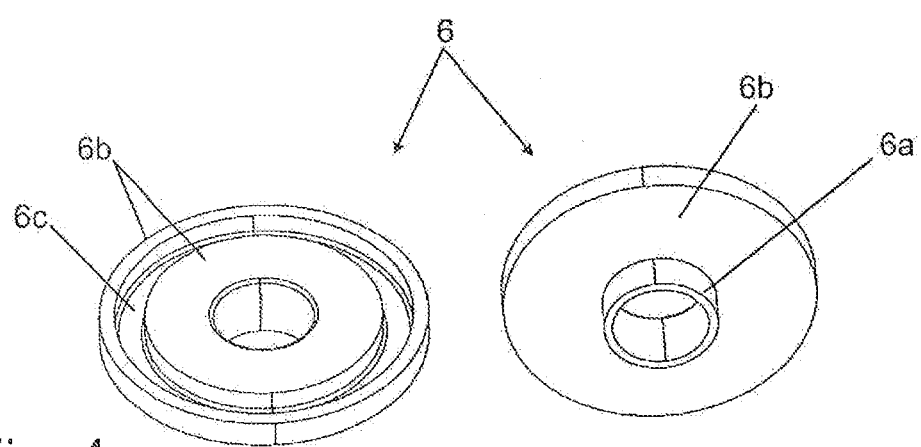
FIG. 4 shows two spatial views of a first connecting part of the connection from FIG. 3.
Figure 5:
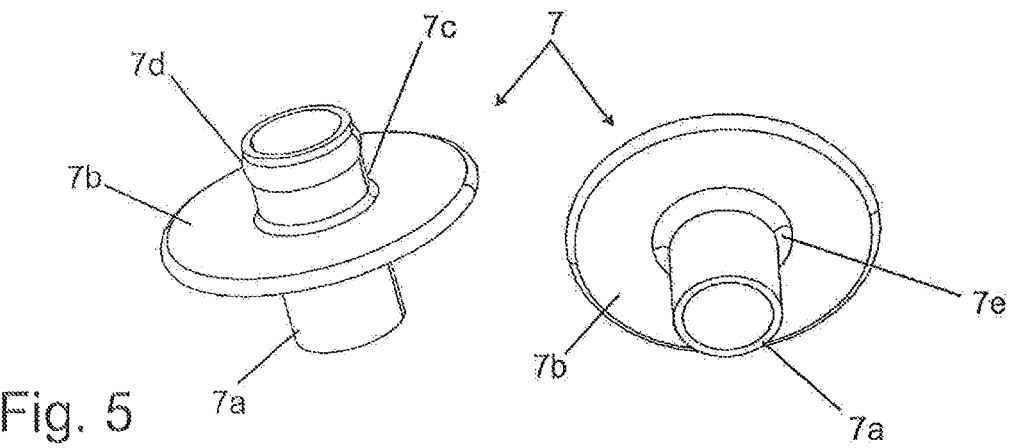
FIG. 5 shows two spatial views of a second connecting part of the connection from FIG. 3.

According to the true-to-scale drawing in FIG. 2, collars 6b, 7b project radially over the edges of the opening in cover 1a to the extent that a particularly stable clamping hold is ensured over a wide area by means of a friction fit.

According to the insertion direction indicated in FIG. 6, heat exchanger 2, together with cover part 1a attached thereto, is inserted into gas channel 1 perpendicularly to the flow direction of gas S, cover 1a coming to rest on the edge of gas channel 1 and being attached gas-tight with the aid of a screw connection, adhesion or other suitable measures.

Figure 7:
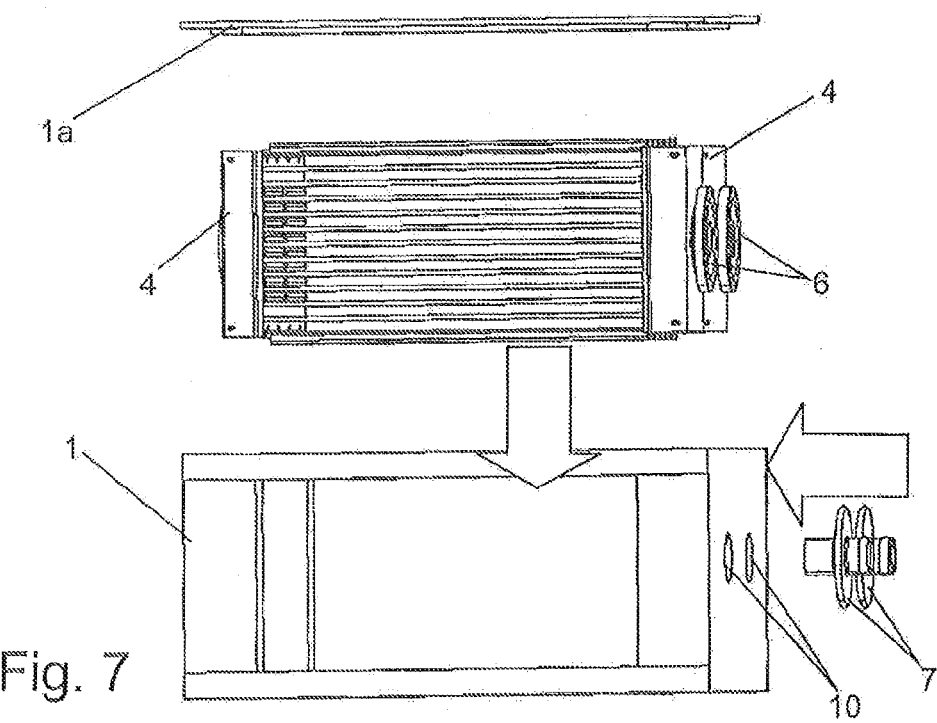
FIG. 7 shows a spatial representation of a second exemplary embodiment of the invention after assembly.

FIG. 7 shows a further specific embodiment of the invention in which connections 5 are oriented perpendicularly to the insertion direction of heat exchanger 2 with regard to the fluid flow. The horizontal arrow, which illustrates the screw-in direction of second connecting parts 7, also corresponds to the flow direction of the fluid in connection 5 and is perpendicular to the insertion direction of heat exchanger 2 into gas channel 1 indicated by the perpendicular part. In this specific embodiment, heat exchanger 2 is first inserted into gas channel 1 until first connecting parts 6 overlap with openings 10 in the wall of gas channel 1. To complete connections 5, second connecting parts 7 are then inserted into openings 10 and screwed into first connecting parts 6. Both a sealing of connecting parts 6, 7 and a mechanical holding of heat exchanger 2 on gas channel 1 are achieved with the aid of collars 6b, 7b as well as ring seals 8, 9.

Cover 1a is subsequently placed onto gas channel 1 and attached to form a seal.

It is understood that, in addition to ring seals 8, 9, other sealing measures may be provided, for example an adhesion or the use of a liquid thread sealant. Such further measures preferably do not prevent the screw connections of connecting parts 6, 7 from being detached, which makes it possible to maintain or replace heat exchanger 2 disposed in gas channel 1.

The invention being thus described, it will be obvious that the same may be varied in many ways. Such variations are not to be regarded as a departure from the spirit and scope of the invention, and all such modifications as would be obvious to one skilled in the art are to be included within the scope of the following claims.

What is claimed is:

1. A gas cooler for an internal combustion engine, the gas cooler comprising:
    a gas channel housing adapted for permeation by a gas flow fed to the internal combustion engine in a flow direction, the gas channel housing having a cover, the cover having an opening; and
    a heat exchanger inserted in the gas channel housing in an insertion direction, the heat exchanger having at least one connection for feeding or discharging a fluid for cooling the gas flow,
    wherein the at least one connection includes a first connecting part, which is connected to the heat exchanger before the heat exchanger is inserted in the gas channel housing, and a second connecting part, a portion of the second connecting part is inserted through the opening of the cover to connect with the first connecting part, such that the second connecting part is connected to the first connecting part from an outside of the cover of the gas channel housing.

2. The gas cooler according to claim 1, wherein the heat exchanger is at least partially attached to the gas channel housing by connecting the first and second connecting parts.

3. The gas cooler according to claim 1, wherein the first connecting part is screwed to the second connecting part.

4. The gas cooler according to claim 3, wherein the second connecting part includes an outer thread that is configured to be screwed into an inner thread of the first connecting part.

5. The gas cooler according to claim 3, wherein the first connecting part includes an outer thread that is configured to be screwed into an inner thread of the second connecting part.

6. The gas cooler according to claim 1, wherein a sealing member or an O ring seal is provided on at least one of the first or second connecting parts.

7. The gas cooler according to claim 1, wherein a sealing member is provided on each of the two connecting parts.

8. The gas cooler according to claim 1, wherein the first connecting part is integrally connected to the heat exchanger by soldering or welding.

9. The gas cooler according to claim 1, wherein an insertion direction of the heat exchanger and a direction of fluid conduction in the connection do not run parallel to each other.

10. The gas cooler according to claim 1, wherein the heat exchanger is attachable to the cover of the gas channel housing with the aid of the connecting parts, the cover being attachable to the gas channel housing together with the heat exchanger.

11. A gas cooler for an internal combustion engine, the gas cooler comprising:
    a gas channel adapted for permeation by a gas flow fed to the internal combustion engine in a flow direction; and
    a heat exchanger inserted in the gas channel in an insertion direction, the heat exchanger having at least one connection for feeding or discharging a fluid for cooling the gas flow,
    wherein the at least one connection includes a first connecting part, which is connected to the heat exchanger before the heat exchanger is inserted in the gas channel, and a second connecting part, which is connected to the first connecting part from an outside of the gas channel, and
    wherein the first and second connecting parts each have a radial collar, and wherein a housing wall of the gas channel is accommodated between the collars via at least by a friction fit.

12. The gas cooler according to claim 11, wherein the radial collar of the first connecting part has an indentation on an upper surface thereof that accommodates a sealing member, and the radial collar of the second connecting part has a recess on a lower surface thereof that accommodates a sealing member.

13. A gas cooler for an internal combustion engine, the gas cooler comprising:
    a gas channel adapted, for permeation by a gas flow fed to the internal combustion engine in a flow direction; and
    a heat exchanger inserted in the gas channel in an insertion direction, the heat exchanger having at least one connection for feeding or discharging a fluid for cooling the gas flow,
    wherein the at least one connection includes a first connecting part, which is connected to the heat exchanger before the heat exchanger is inserted in the as channel and a second connecting part, which is connected to the first connecting part from an outside of the gas channel, and
    wherein the second connecting part has a projection configured to connect a fluid line, and wherein the projection is a bead or a fast-action coupling.

14. A gas cooler for an internal combustion engine, the gas cooler comprising:
    a gas channel housing permeated by a gas flow fed to the internal combustion engine in a flow direction, the gas channel housing having a gas channel cover that includes at least one opening;
    a heat exchanger inserted inside of the gas channel housing in an insertion direction, the heat exchanger having at least one connection for feeding or discharging a fluid for cooling the gas flow; and
    wherein the at least one connection includes a first connecting part and a second connecting part,
    wherein the first connecting part is connected to the heat exchanger and is positioned inside of the gas channel housing, and
    wherein a portion of the second connecting part is inserted through the at least one opening of the gas channel cover, from an outside of the gas channel housing, and is connected to the first connecting part.

* * * * *